(12) United States Patent
Shimizu et al.

(10) Patent No.: US 9,208,037 B2
(45) Date of Patent: Dec. 8, 2015

(54) DUPLEXED OPERATION PROCESSOR CONTROL SYSTEM, AND DUPLEXED OPERATION PROCESSOR CONTROL METHOD

(75) Inventors: Toshiki Shimizu, Hitachi (JP); Akira Bando, Hitachi (JP); Yusaku Otsuka, Hitachiota (JP); Yasuhiro Kiyofuji, Hitachi (JP); Eiji Kobayashi, Hitachinaka (JP); Akihiro Onozuka, Hitachi (JP); Satoru Funaki, Hitachi (JP); Masakazu Ishikawa, Hitachi (JP); Hideaki Masuko, Hitachi (JP); Yusuke Seki, Hitachi (JP); Wataru Sasaki, Hitachiota (JP); Naoya Mashiko, Hitachiota (JP); Akihiro Nakano, Iwaki (JP); Shin Kokura, Hitachi (JP); Shoichi Ozawa, Hitachi (JP); Yu Iwasaki, Hitachi (JP)

(73) Assignees: HITACHI, LTD., Tokyo (JP); HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 833 days.

(21) Appl. No.: 12/457,682

(22) Filed: Jun. 18, 2009

(65) Prior Publication Data
US 2009/0319756 A1     Dec. 24, 2009

(30) Foreign Application Priority Data
Jun. 19, 2008 (JP) .................................. 2008-160877

(51) Int. Cl.
*G06F 11/20* (2006.01)
*G06F 11/16* (2006.01)
*G06F 9/445* (2006.01)

(52) U.S. Cl.
CPC .............. *G06F 11/2033* (2013.01); *G06F 8/67* (2013.01); *G06F 11/1658* (2013.01); *G06F 11/2028* (2013.01); *G06F 11/2038* (2013.01); *G06F 11/2097* (2013.01)

(58) Field of Classification Search
CPC .......................... G06F 11/2033; G06F 11/1658
USPC .......... 700/79, 81, 82; 714/4.11, 4, 11; 712/30
See application file for complete search history.

(56) References Cited

U.S. PATENT DOCUMENTS

| 5,008,805 A * | 4/1991 | Fiebig et al. ..................... 700/79 |
| 2004/0025078 A1 | 2/2004 | Nagano et al. |
| 2009/0044044 A1 | 2/2009 | Harter et al. |

FOREIGN PATENT DOCUMENTS

| CN | 1477468 A | 2/2004 |
| JP | 9-245008 | 3/1996 |

(Continued)

OTHER PUBLICATIONS

The First Office Action issued on Mar. 23, 2011, by the State Intellectual Property Office of People's Republic of China in the corresponding Chinese Application No. 200910150301.1 (6 pages) with an English language translation (3 pages).
Office Action, from the Japanese Patent Office, issued in the corresponding Japanese Patent Application No. 2008-160877, dated Nov. 30, 2013, pp. 1-2.

(Continued)

*Primary Examiner* — Benjamin Geib
(74) *Attorney, Agent, or Firm* — Mattingly & Malur, PC

(57) ABSTRACT

The present invention provides a duplexed operation processor control system that includes operation processors, an I/O device, and at least one communication path that couples the operation processors to the I/O device, and at least one communication path that couples the operation processors with each other. The duplexed operation processor control system switches over either of the operation processors to be a primary operation processor that executes a control operation for a control target, and the other to be a secondary operation processor that is in a stand-by state, and the secondary operation processor snoops control data synchronously when the primary operation processor acquires the control data from the control target.

7 Claims, 5 Drawing Sheets

(56) References Cited

FOREIGN PATENT DOCUMENTS

| JP | 9-305424 | 5/1996 |
|----|----------|--------|
| JP | 09-245008 | 9/1997 |
| JP | 11-015502 | 1/1999 |
| JP | 2001-060159 | 3/2001 |
| WO | WO 2007/057271 A1 | 5/2007 |

OTHER PUBLICATIONS

Office Action, from the Japanese Patent Office issued in the corresponding Japanese Patent Application No. 2008-160877, dated Dec. 4, 2012, pp. 1-2.

Office Action, issued from the Japanese Patent Office, in the counterpart Japanese Patent Application No. 2008-160877, dated Jun. 19, 2012, pp. 1-4.

* cited by examiner

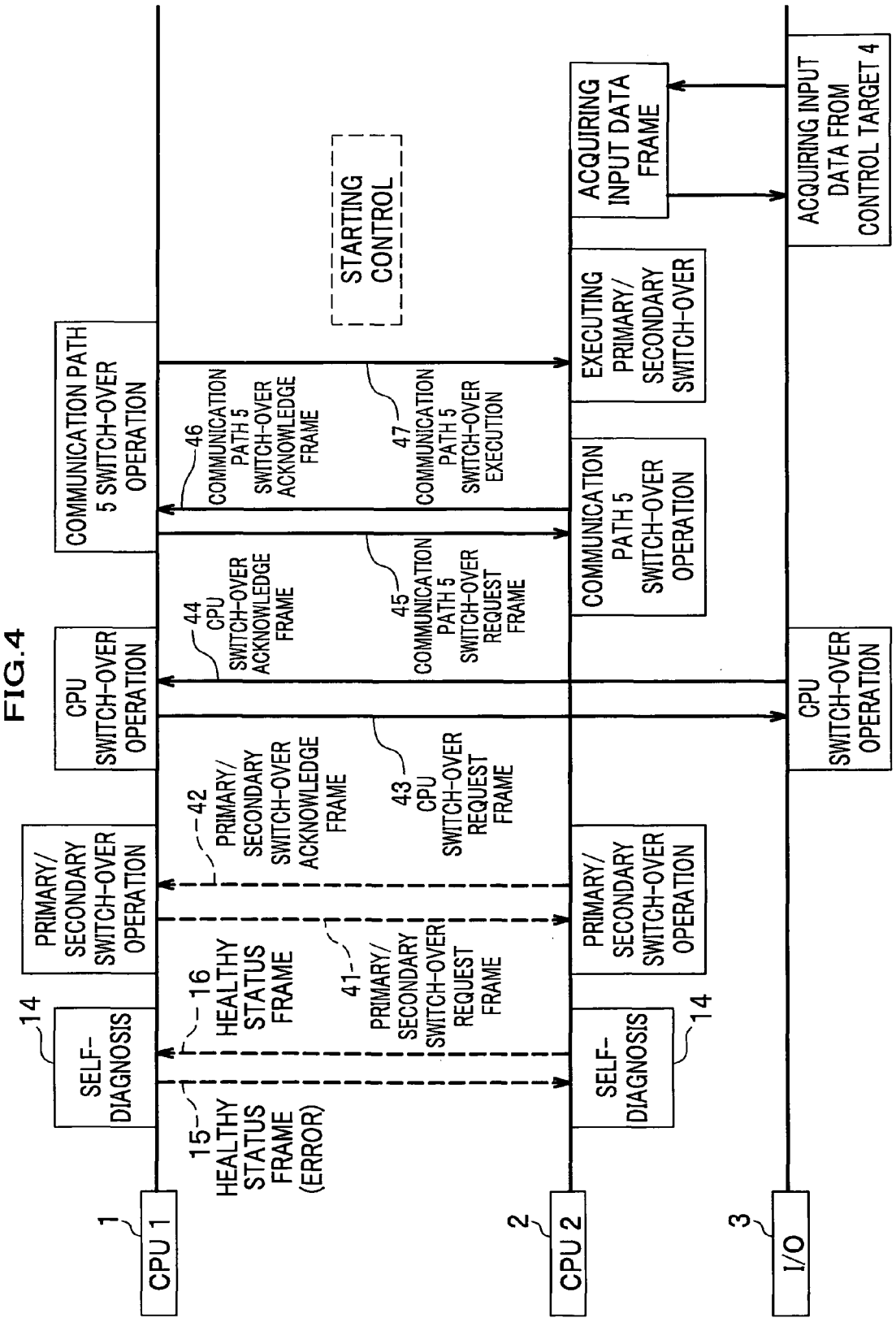

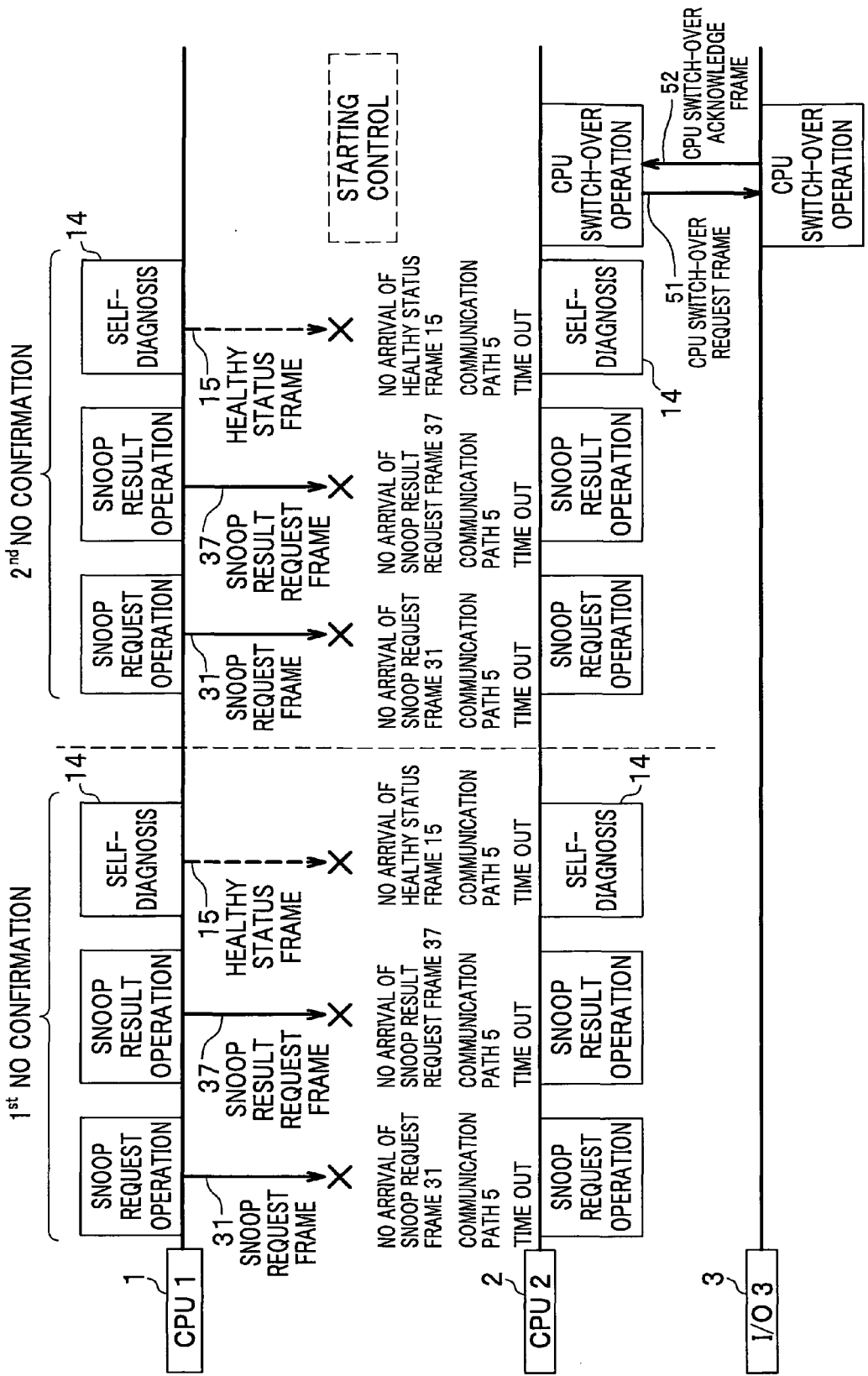

DUPLEXED OPERATION PROCESSOR CONTROL SYSTEM, AND DUPLEXED OPERATION PROCESSOR CONTROL METHOD

CROSS-REFERENCE TO RELATED APPLICATION

This application claims the foreign priority benefit under 35 U.S.C. §119 of Japanese Patent Application No. 2008-160877 filed on Jun. 19, 2008, the disclosure of which is incorporated herein by reference.

BACKGROUND OF THE INVENTION

1. Field of the Invention

The present invention relates to technique regarding a duplexed system for an operation processor (hereinafter referred to as "CPU") used in a plant control and the like.

2. Description of the Related Art

Conventionally, CPUs used for a plant system control or the like are duplexed or multiplexed so as to provide a control without stopping the plant system even when a trouble occurs in a primary CPU, or to allow a secondary CPU to update a control program without stopping the plant system during the program updating operation, thereby to enhance availability of the system. On such an occasion, a quick CPU switch-over is required when a program is updated or a problem occurs.

In order to provide such a quick switch-over operation, it is required that plural CPUs acquire control information from a control target in an identical manner among the CPUs. In order for plural CPUs to acquire control information in an identical manner, it has been known that each CPU individually acquires control information from a control target, or that one of duplexed CPUs snoops memory data on the other CPU to acquire control information of interest, as disclosed in JP H09-305424 and JP H09-245008.

However, in the above conventional case, since the memory data frame is snooped from a line coupling a primary CPU to the memory data, and a secondary CPU acquires the memory data frame via an equalization bus using parallel buses that are weak against noise, this technique is not suitable to a long distance data transmission. Addition to the above difficulty, data frame to be snooped is usually stored on the primary CPU, so that the primary CPU and the secondary CPU cannot process the data synchronically, which may cause time delay and sacrifice response speed of the system, and a function of updating a program without stopping the plant system is additionally required, which makes functions of the system more complicated.

In order to address the above difficulties, the present invention has an object to provide a duplexed CPU control system that is strong against noise even though a distance between a primary CPU and a secondary CPU becomes longer, without scarifying response speed of a system, providing a quick switch-over between the primary and secondary CPUs at the time of updating a program or a problem occurrence.

The present invention has another object to provide a duplexed CPU control system that updates a control program for controlling a plant without stopping a plant system, with no requiring an additional function to perform a program updating.

Other features and advantages of the present invention will become more apparent from the following detailed description of the invention when taken in conjunction with the accompanying exemplary drawings.

SUMMARY OF THE INVENTION

In one aspect of the present invention, there is provided a duplexed operation processor control system that includes operation processors, an I/O device, and at least one communication path that couples the operation processors to the I/O device, and at least one communication path that couples the operation processors with each other, and the duplexed operation processor control system switches over either of the operation processors to be a primary operation processor that executes a control operation for a control target, and the other to be a secondary operation processor that is in a stand-by state, wherein the secondary operation processor snoops control data synchronously when the primary operation processor acquires the control data from the control target.

BRIEF DESCRIPTION OF THE DRAWINGS

FIG. 4 is a time chart of a switching process to switch a secondary CPU to the primary when a trouble occurs in the primary CPU.

FIG. 5 is a time chart of a switching process to switch a secondary CPU to the primary when no snooping result request is received from a primary CPU.

DETAILED DESCRIPTION OF THE PREFERRED EMBODIMENTS

With reference to the attached drawings, descriptions will be provided on an embodiment of the present invention.

Figure 1:
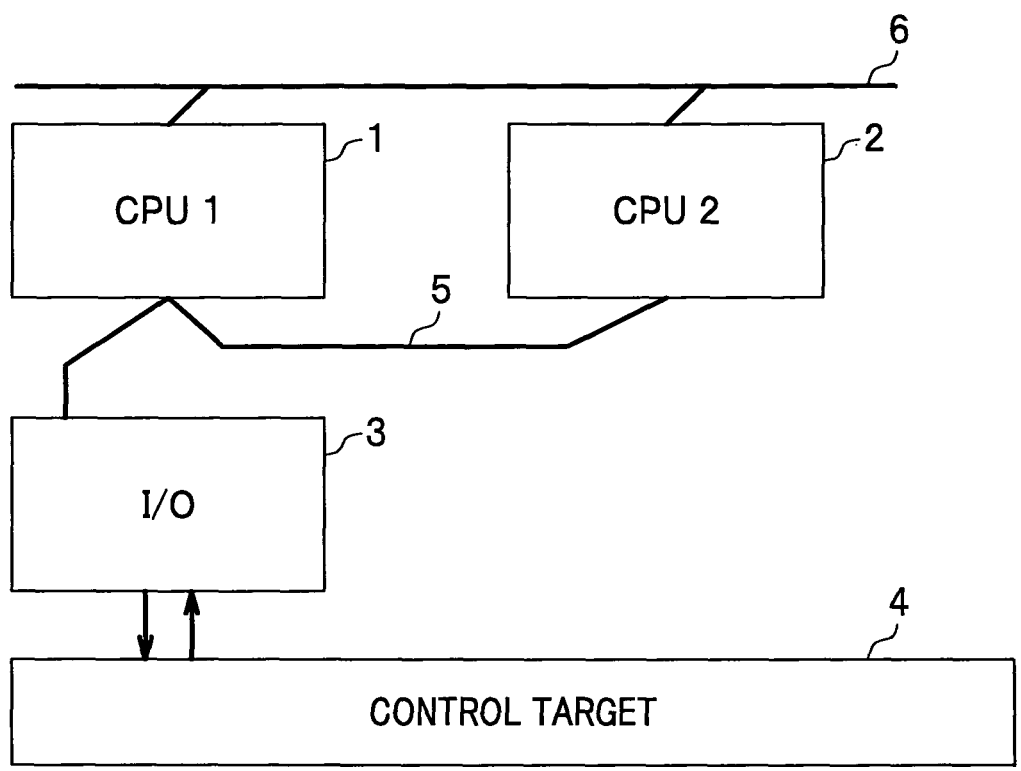
FIG. 1 is a block diagram of a duplexed CPU control system according to an embodiment of the present invention.
Figure 2:
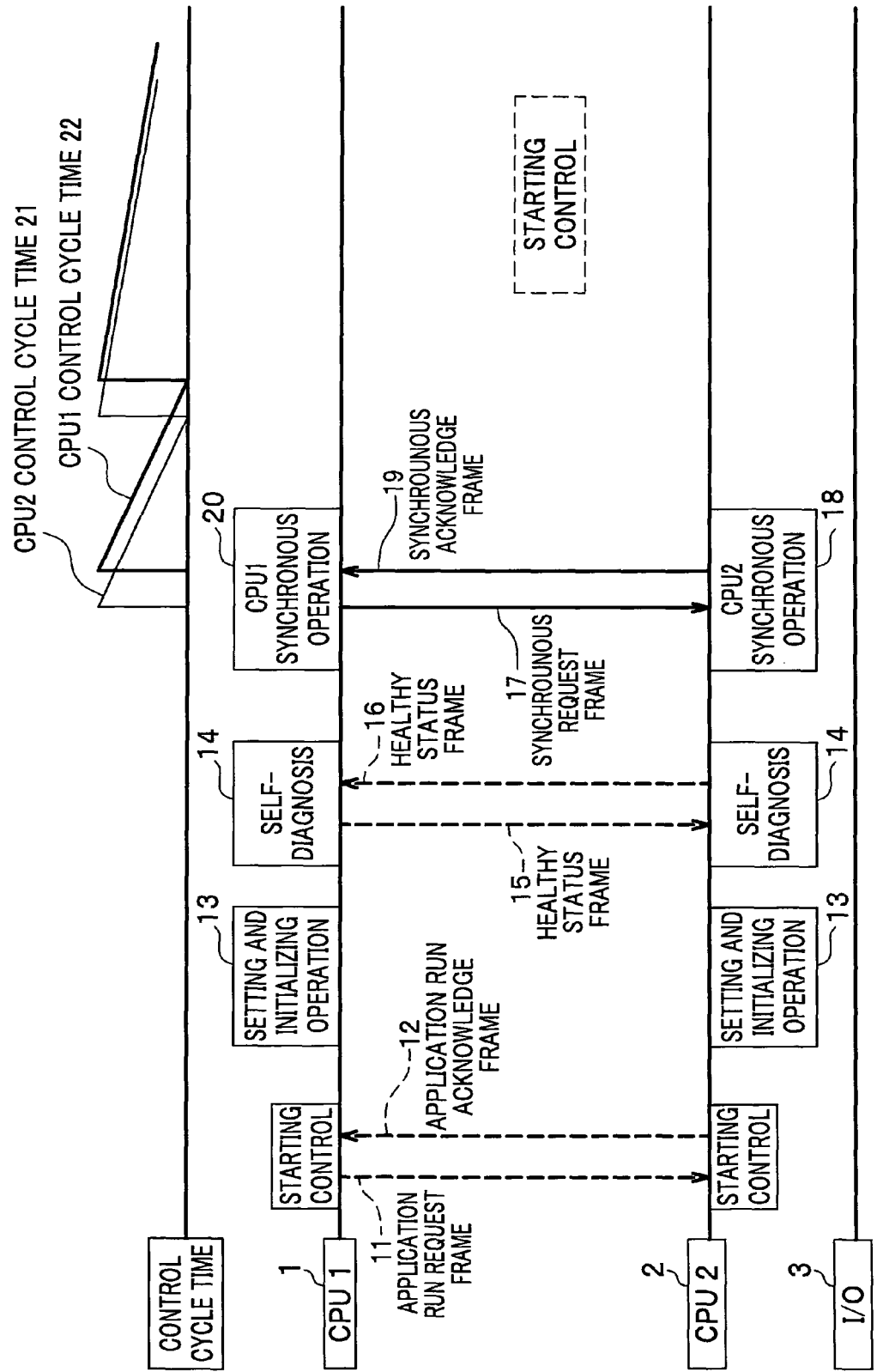
FIG. 2 is a time chart of the duplexed CPU control system according to the embodiment in a normal state.
Figure 3:
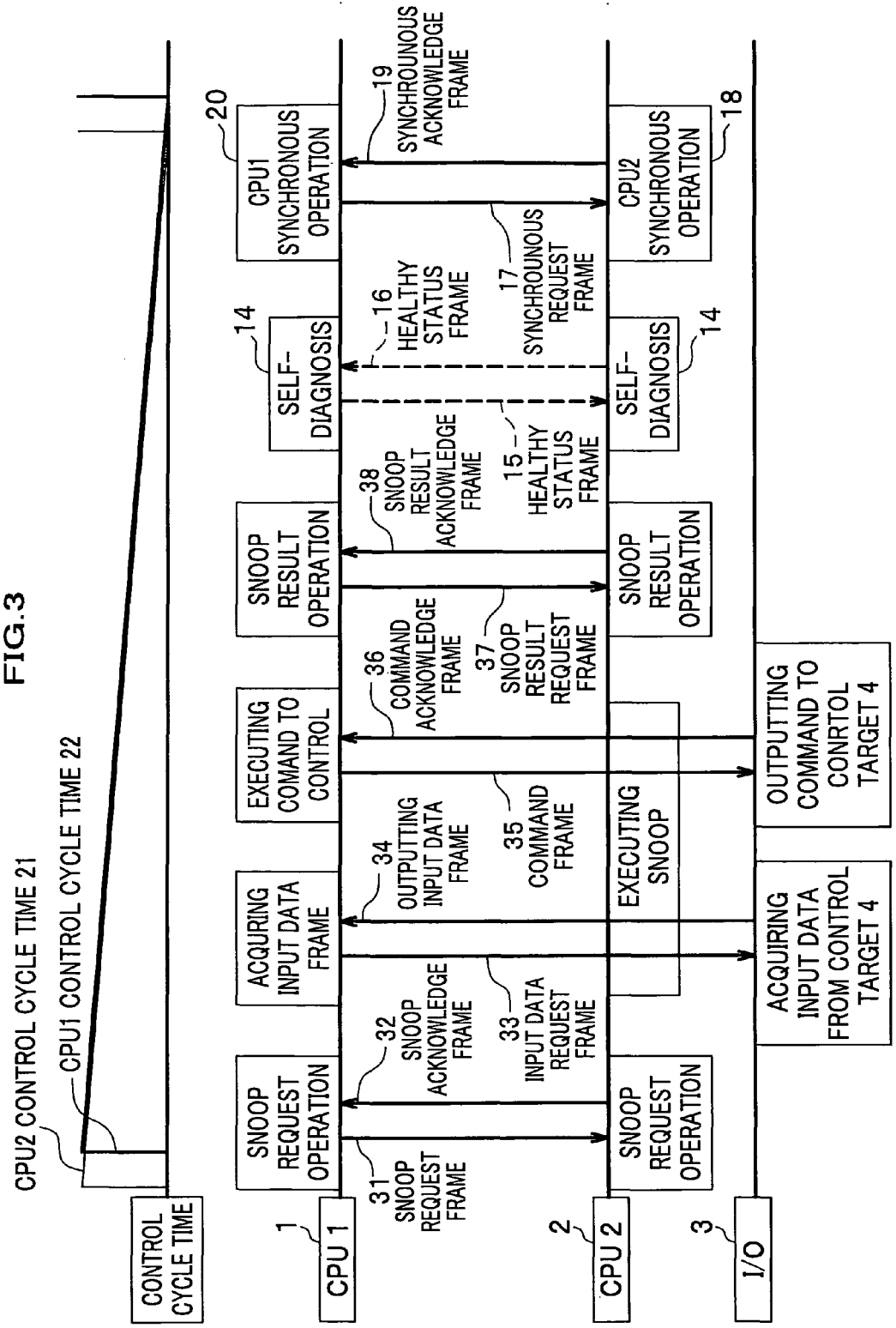
FIG. 3 is a time chart of the duplexed CPU control system according to the embodiment in a normal state.

FIG. 1 is a block diagram of a duplexed CPU control system, FIGS. 2 and 3 show a time chart of the duplexed CPU control system in a normal condition, and FIG. 4 shows a time chart of a switch-over process to switch over the CPUs between the "primary" and the "secondary" when a trouble occurs in the primary CPU. FIG. 5 shows a time chart of a switch-over process to switch over CPUs between the "primary" and the "secondary" when the secondary CPU does not confirm the arrival of snooping result request frames.

The duplexed CPU control system of FIG. 1 includes the CPU 1 and the CPU 2 both of which have an identical system; the I/O 3 that is an input/output device coupling the CPU 1 to the CPU 2; the control target 4 that is coupled to the I/O 3; the communication path 5 that couples the CPU 1 to CPU 2 and to the I/O 3; the communication path 6 that couples the CPU 1 to CPU 2, etc.

The communication path 5 allows the CPU 1 and CPU 2 to be communicable with the bus I/O 3 where a bus master such as RS-485 exists, and also communicable to the bus I/O 3 even when the CPU 1 and the CPU 2 are synchronized in the duplexed control. The primary CPU retains an authority to use the bus master. The communication path 5 is mainly used for communication with the I/O 3 when a request for synchronizing the CPU 1 and the CPU 2 is made.

The communication path 6 is communicable between the CPU 1 and the CPU 2, and mainly used for communication in which synchronization is seldom required between the CPU 1 and the CPU 2 in the duplexed control, such as a communication using the Ethernet™.

Hereinafter, descriptions will be provided on processes of the duplexed CPU control system, assuming that the CPU 1 is a primary CPU and the CPU 2 is a secondary CPU.

While the primary CPU 1 actually sends a control command to the control target 4, the secondary CPU 2 does not control the control target 4 and is in a stand-by state ready to be switched over when a trouble occurs in the primary CPU 1.

In the present invention, since the primary and secondary CPUs have identical functions so that the switch-over between the primary and the secondary CPUs can be performed, either of the CPU 1 and the CPU 2 may be predefined to be primary and the other to be secondary. Alternatively, either of the CPU 1 and the CPU 2 may not be predefined to be primary or secondary, but either CPU that has activated earlier than the other may be set to be primary.

With reference to FIG. 2 and FIG. 3, descriptions will be given on an example of a normal control in the deplexed CPU control system.

Arrows in broken lines show communications via the communication path 6, and arrows in solid lines show communications via the communication path 5.

When defined to be a primary CPU earlier than the CPU 2, the CPU 1 sends to the CPU 2 the application run request frame 11 which is a command to start a control via the communication path 6.

When receiving the application run request frame 11, the secondary CPU 2 sends the application run acknowledge frame 12, and then both the primary and secondary CPUs 1 and 2 perform the setting and initializing operation 13 to start the control, respectively.

After the setting and initializing operation 13 is completed, the primary and secondary CPUs 1 and 2 perform a self-diagnosis to determine by itself whether or not each CPU operates in a normal condition, and then the primary CPU 1 sends the health status frame 15 as its self-diagnosis result to the secondary CPU 2 via the communication path 6.

When receiving the health status frame 15 from the CPU 1, the CPU 2 sends its health status frame 16 as its self-diagnosis result to the CPU 1 via the communication path 6.

If there is any problem in the self-diagnosis result of the CPU 1, a switch-over between the primary CPU 1 and the secondary CPU 2 is executed. The details of the switch-over between the primary CPU 1 and the secondary CPU 2 will be described later on.

To the contrary, if there is any problem in the self-diagnosis result of the CPU 2, the switch-over to the secondary CPU 2 is prohibited, and if there is no problem in each self-diagnosis result of the CPU 1 and CPU 2, the primary CPU 1 sends the synchronous request frame 17 to the secondary CPU 2 via the communication path 5.

The CPU 2 is triggered to start the synchronous operation 18 at the time when the CPU 2 receives the synchronous request frame 17, and starts the control cycle time 21 of the secondary CPU 2, as well as sending the synchronous acknowledge frame 19 to the primary CPU 1 via the communication path 5.

At the time when receiving the synchronous acknowledge frame 19, the primary CPU 1 executes the synchronous operation 20, as well as starting control cycle time 22 of the primary CPU 1. This process causes the phase of the control cycle time 22 of the primary CPU 1 to be retarded relative to that of the secondary CPU 2.

Specifically, the secondary CPU 2 starts its control cycle time 21 immediately when the CPU 2 receives the synchronous request frame 17. Meanwhile, the primary CPU 1 starts its control cycle time 22 after the CPU 1 receives the synchronous acknowledge frame 19 sent from the CPU 2, therefore, the CPU 1 delays in start of its control cycle time 22 by the time difference from the time when the CPU 2 receives the synchronous request frame 17 from the CPU 1 to the time when the CPU 1 receives the synchronous acknowledge 19 from the CPU 2.

Hence, the CPU 2 whose phase is relatively in advance of the phase of the CPU 1 can execute operations necessary for a communication or a control operation after the synchronous operation is performed prior to the CPU 1, and also can be in a stand-by state for input in advance of the primary CPU 1.

Thereafter, the primary CPU 1 sends via the communication path 5 the secondary CPU 2 the snoop request frame 31 to confirm whether or not the secondary CPU 2 can snoop data. When receiving the snoop request frame 31 from the primary CPU 1, the secondary CPU 2 sends the primary CPU 1 the snoop acknowledge frame 32 via the communication path 5. At this time, the secondary CPU 2 whose phase is relatively in advance of that of the primary CPU 1 is in the stand-by state for data snooping.

Therefore, the secondary CPU 2 can send the snoop acknowledge frame 32 to the primary CPU 1 immediately when receiving the snoop request frame 31 from the CPU 1 via the communication path 5.

Since the secondary CPU 2 is already in the stand-by state for data snooping, the primary CPU 1 does not need to wait ready until the CPU 2 becomes in the snooping state, so that the primary CPU 1 can immediately receives the snoop acknowledge frame 32 from the secondary CPU 2; therefore, the primary CPU 1 never scarifies its response speed.

Next, the primary CPU 1 sends the I/O 3 the input data request frame 33 that requests to send input data regarding the control target 4, which is essential to a control operation. Then, in response to the input data request frame 33, the I/O 3 sends the primary CPU 1 the input data frame 34 acquired from the control target 4 via the communication path 5.

At this time, the secondary CPU 2 snoops the input data frame 34 that is being sent from the I/O 3 to the primary CPU 1 via the communication path 5.

The primary CPU 1 sends the command frame 35 to the I/O 3 based on the input data regarding the control target 4 acquired from the I/O 3, but the secondary CPU 2 does not send this frame 35 to the I/O 3.

In response to the command frame 35, the I/O 3 sends the command acknowledge frame 36 to the primary CPU 1 via the communication path 5.

The primary CPU 1 sends the secondary CPU 2 the snooping result request frame 37 to confirm whether or not the secondary CPU 2 snooped the input data regarding the control target, in response to the command frame 35. When receiving the snooping result request frame 37, the secondary CPU 2 sends the primary CPU 1 the snooping result acknowledge frame 38 if succeeding in data snooping.

The primary CPU 1 confirms whether or not the secondary CPU 2 succeeded in data snooping based on the snooping result acknowledge frame 38, and if the primary CPU 1 confirms that the secondary CPU 2 fails in the data snooping several times in series, the CPU 1 determines that any problem occurs in the secondary CPU 2, so that the CPU 1 decides to prohibit the switch-over operation to the secondary CPU 2.

To the contrary, if confirming that the secondary CPU 2 succeeded in data snooping, the primary CPU 1 executes the self-diagnosis 14 to determine by itself whether or not the CPU 1 operates normally, as mentioned above, and sends/receives the healthy status frames 15, 16 which are data regarding the respective health statuses to/from the secondary CPU 2, as well as executing the synchronous operation 20 that is a synchronous request operation. Note that, as mentioned above, when receiving the health status frame 15 from the primary CPU 1, the secondary CPU 2 executes the self-diagnosis 14, and then sends the healthy status frame 16 to the primary CPU 1.

The operations described with reference to FIGS. 2 and 3 are executed as one control cycle time, and the secondary CPU 2 whose phase is advanced relative to the phase of the primary CPU 1 snoops the data regarding the control target while the primary CPU 1 is acquiring the data, thereby to realize hot-standby in the duplexed CPU control system without scarifying the primary CPU 1's response speed to the control target.

Since the control operation of the CPU 1 is not carried out for the entire duration of the control cycle time 22 of the CPU 1, the phase of the secondary CPU 2 may be appropriately advanced relative to that of the primary CPU 1 by a time difference between the terminal time point of the control operation and the terminal time point of the control cycle time 22 of the CPU 1.

"Snooping" used in this specification denotes "snooping and reading data via a branched signal line", as described in JP H09-245008A for example.

With reference to the time chart of FIG. 4, hereinafter descriptions will be given on how to provide a switch-over control when the system is shut down due to a trouble in the CPU 1 for some reason, assuming that the CPU 1 serves as primary and the CPU 2 serves as secondary.

As described above, the primary CPU 1 and the secondary CPU 2 communicate with each other by transmitting via the communication path 5 the healthy status frames 15, 16, which are data regarding whether or not each operates normally. Now, how to provide a switch-over control if it is determined that error data is included in the healthy status data of the CPU 1 based on the self-diagnose 15 will be discussed.

If an error occurs in the self-diagnose 14, the primary CPU 1 determines that a trouble has occurred in the CPU 1 itself, and sends the healthy status frame 15 including the detected error data to the secondary CPU 2 via the communication path 6.

When receiving the healthy status frame 15, the secondary CPU 2 sends its healthy status frame 16 to the primary CPU 1 via the communication path 6. When receiving the healthy status frame 16 and if the frame 16 represents that the secondary CPU 2 is healthy, the primary CPU 1 sends the primary/secondary switch-over request frame 41 to the secondary CPU 2 via the communication path 6. When receiving the primary/secondary switch-over request frame 41, the secondary CPU 2 sends the primary/secondary switch-over acknowledge frame 42 to the primary CPU 1 via the communication path 6.

After receiving the primary/secondary switch-over acknowledge frame 42, the primary CPU 1 sends the CPU switch-over request frame 43 to the I/O 3. When receiving the request frame 43, the I/O 3 sends the CPU switch-over acknowledge frame 44 to the primary CPU 1 via the communication path 5, so as to confirm that the CPU switch-over will be executed.

Then, the primary CPU 1 sends the communication-path-5 switch-over request frame 45 to the secondary CPU 2. Receiving the request frame 45, the secondary CPU 2 confirms safe receipt of the request frame 45 and sends the communication path 5 switch-over acknowledge frame 46 to the primary CPU 1. After receiving the acknowledge frame 46, the primary CPU 1 carries out the communication path 5 switch-over execution 47 so as to transfer the authority to use the communication path 5 through this communication path 5 switch-over operation, thereby to complete the transfer of the authority from the primary CPU 1 to the secondary CPU 2, and then the CPU 2 is switched over from the secondary to the primary.

In such a switch-over operation, the secondary CPU 2, in advance, acquires control data regarding the control target 4 and the like (e.g. the input data, the input data frame 34) that the primary CPU 1 possesses through the data snooping operation; therefore, the secondary CPU 2 does not need to acquire the control data when controlling the system as a primary CPU, which allows the CPU 2 to operate immediately as the primary CPU.

In the present embodiment, based on the healthy status frame 15 of the primary CPU 1, the CPU 1 outputs the primary/secondary switch-over request frame 41. However, the primary/secondary switch-over request frame 41 may be sent in response to an external command, and the primary/secondary switch-over operation may be executed manually.

Meanwhile, if there is no error in the healthy status frame, as similar to the normal state, the phase of the control cycle time of the CPU 1 as secondary may be advanced relative to that of the CPU 2 as primary.

Specifically, the primary CPU 2, switched over from secondary, executes the same operations as the primary CPU 1 in the normal state does, as described above. More specifically, the primary CPU 2 sends the synchronous request frame 17 to the secondary CPU 1 via the communication path 5. When receiving the synchronous request frame 17, the secondary CPU 1 is triggered to execute the synchronous operation 18 and start the control cycle time 21 of the secondary CPU 1, as well as sending the synchronous acknowledge frame 19 to the primary CPU 2 via the communication path 5. When receiving the synchronous acknowledge frame 19, the primary CPU 2 executes the synchronous operation 20 to start the control cycle time 22 of the primary CPU 2. At this time, the primary CPU 2 retards its phase of the control cycle time 22 relative to the control cycle time 21 of the secondary CPU 1, which is the same as the above mentioned normal operation case.

With reference to FIG. 5, hereinafter, descriptions will be provided on how to perform the primary/secondary CPU switch-over process in another condition. In this condition, the secondary CPU does not consecutively confirm arrivals of snooping request-related frames to be sent from the primary CPU if in a normal state.

In the control cycle time, if the secondary CPU 2 cannot confirm several consecutive times arrival of the snoop request frame 31, the snooping result request frame 37 and the healthy status frame 15 that are to be periodically sent from the primary CPU 1 when the CPU 1 normally operates, the secondary CPU 2 determines that the primary CPU 1 is currently in trouble. Note that this trouble may be checked by using a time-out detection preconfigured in the communication paths 5 and 6.

At this time, the secondary CPU 2 switches over to the primary by itself, acquires the authority to use the communication path 5 and outputs the CPU switch-over request frame 51 to the I/O 3. When receiving the CPU switch-over request frame 51, the I/O 3 sends the CPU switch-over acknowledge frame 52 to the CPU 2 via the communication path 5, and then the CPU 2 switches over to the primary by itself starts to control the system. Thereafter, the CPU 1 that has been detected to be currently in trouble will not be switched over to the primary.

As described above, the CPU primary/secondary switch-over operation can be carried out even when the primary CPU makes no response.

Hereinafter, descriptions will be given on how to switch over the CPU control program without shutting down the plant controlled by the CPUs, using the duplexed CPU control system, assuming that the CPU 1 is primary and the CPU 2 is secondary.

When updating the CPU control program without shutting down the system, the program updating may be carried out in the secondary CPU 2. Since the secondary CPU 2 does not directly control the system as mentioned above, the program switch-over can be carried out without shutting down the system. In addition, since the secondary CPU 2 can snoop and acquire control data that the primary CPU 1 has acquired from the I/O 3, the secondary CPU 2 can operate in the same manner as the primary CPU 1 that controls the system does.

After updating the CPU control program, based on the control data snooped and acquired, the secondary CPU 2 creates a command frame for the system by using the updated program, and compares the created command frame with a command frame for the system of the control target 4 output from the primary CPU 1. If the compared result represents that the command frame of the secondary CPU 2 accords or likely to accord with the command frame of the primary CPU 1, which means the secondary CPU 2 operates normally, then the secondary CPU 2 determines that the updated control program has no problem to control the system, and requests an external command to instruct the primary CPU 1 to issues the primary/secondary switch-over request frame 41.

As explained above, the duplexed CPU control system of the present invention realizes a control program replacement (or update), which may be likely to occur at an earlier stage of installing a plant system, without shutting down a system operation, by previously estimating the control program replacement (or update) in the secondary CPU 2. Accordingly, the duplexed CPU control system of the present invention can prevent a trouble such as a system shut down due to a control program replacement (update).

According to the present invention, a secondary CPU in a stand-by state synchronously snoops control data of a primary CPU when the primary CPU executing the control operations acquires the control data. When executing the equalization operation (hot stand-by) in the CPU dupulexed control system, the secondary CPU has already acquired the control data through the data snooping, thereby to realize hot-standby in the duplexed CPU control system without scarifying the primary CPU's response speed to the control target, as well as a quick switch-over of the CPUs between the primary and the secondary when a trouble occurs.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A duplexed operation processor control system, comprising:
    a pair of operation processors, an I/O device coupled to a control target, a first communication path that couples the operation processors to the I/O device, and a second communication path that couples the operation processors with each other, and wherein one of the operation processors is a primary operation processor which is in an active state for executing control operations for the control target and the other of the operation processors is a secondary operation processor which is in a standby state, wherein each of the operation processors is capable of switching between operating as the primary operation processor and the secondary operation processor, wherein each time data is transmitted between the primary operation processor and the control target via the first communication path, the secondary operation processor acquires the data contemporaneously with the transmission via a branched signal line that connects the I/O device to both the primary and secondary operation processors and performs a same operation as an operation performed by the primary operation processor based on the acquired data, wherein a phase of a second control cycle time of the secondary operation processor is advanced relative to a phase of a first control cycle time of the primary operation processor, and wherein the secondary operation processor is triggered to start the second control cycle time thereof, in response to a synchronous request frame sent from the primary operation processor to the secondary operation processor, and the primary operation processor is triggered to start the first control cycle time thereof, in response to a synchronous acknowledge frame output from the secondary operation processor to the primary operation processor as a response to the synchronous request frame.

2. The duplexed operation processor control system as claimed in claim 1, wherein the switching over operation of the operation processors between primary and secondary is carried out if a trouble is detected in a self-diagnosis executed by the primary operation processor, or if the secondary operation processor determines that sending of frames to be periodically output from the primary operation processor to the secondary operation processor in a normal state is stopped.

3. The duplexed operation processor control system as claimed in claim 1, wherein, a program updating is carried out in the secondary operation processor prior to the switching over operation of the operation processors, and, the switching over operation of the operation processors is executed after the secondary operation processor determines that the secondary operation processor operates normally based on the updated program by using the data that has been acquired by the secondary operation processor.

4. A duplexed operation processor control method for a duplexed operation processor control system comprising a pair of operation processors, an I/O device coupled to a control target, a first communication path that couples the operation processors to the I/O device, and a second communication path that couples the operation processors with each other, the method comprising:
    configuring one of the operation processors to be a primary operation processor which is in an active state for executing control operations for the control target and the other of the operation processors to be a secondary operation processor which is in a standby state such that each of the operation processors is capable of switching between operating as the primary operation processor and the secondary operation processor, where a phase of a second control cycle time of the secondary operation processor is advanced relative to a phase of a first control cycle time of the primary operation processor;

directing, each time data is transmitted between the primary operation processor and the control target via the first communication path, the secondary operation processor to acquire the data contemporaneously with the transmission via a branched signal line that connects the I/O device to both the primary and secondary operation processors and to perform a same operation as an operation performed by the primary operation processor based on the acquired data; and triggering the secondary operation processor to start the second control cycle time thereof, in response to a synchronous request frame sent from the primary operation processor to the secondary operation processor, and triggering the primary operation processor to start the first control cycle time thereof, in response to a synchronous acknowledge frame output from the secondary operation processor to the primary operation processor as a response to the synchronous request frame.

5. The duplexed operation processor control system as claimed in claim 4, wherein the step of switching over the operation processors between primary and secondary is carried out if a trouble is detected in a self-diagnosis executed by the primary operation processor, or if the secondary operation processor determines that sending of frames to be periodically output from the primary operation processor to the secondary operation processor in a normal state is stopped.

6. The duplexed operation processor control method as claimed in claim 4, wherein, a program updating is carried out in the secondary operation processor prior to the switching over operation of the operation processors, and the step of switching over the processors is executed after the secondary operation processor determines that the secondary operation processor operates normally based on the updated program by using the data that has been acquired by the secondary operation processor.

7. The duplexed operation processor control method as claimed in claim 4, further comprising:

allowing the secondary operation processor to acquire control data transmitted to the primary operation processor via the branched signal contemporaneously with the control data being transmitted to the primary operation processor from the control target along the first communication path.

* * * * *